United States Patent [19] [11] 4,360,841
Mita [45] Nov. 23, 1982

[54] DATA CORRECTION CIRCUIT
[75] Inventor: Michio Mita, Isehara, Japan
[73] Assignee: Sony Corporation, Tokyo, Japan
[21] Appl. No.: 220,094
[22] Filed: Dec. 24, 1980
[30] Foreign Application Priority Data
 Dec. 25, 1979 [JP] Japan .................................. 54-168640
[51] Int. Cl.³ ........................ G11B 27/02; G11B 15/18
[52] U.S. Cl. .................................... 360/13; 360/72.2;
 360/14.3; 369/83
[58] Field of Search ...................... 360/13, 14, 36, 72.2
[56] References Cited
 U.S. PATENT DOCUMENTS
 4,134,131 1/1979 Hopkins, Jr. ......................... 360/36

Primary Examiner—Vincent P. Canney
Attorney, Agent, or Firm—Lewis H. Eslinger; Alvin Sinderbrand

[57] ABSTRACT

A time code correction circuit is formed of an input circuit for receiving an input time code; first and second memories for storing data representing the time code; an adder for selectively incrementing or decrementing data to be supplied to the first and second memories; a comparator comparing the data stored in the first memory with the input time code; a switch controlled by the comparator for selectively supplying the adder with the input time code and the data started second memory; and an output circuit coupled to provide the contents of the second memory as a corrected output time code. Where the time code is reproduced from a time code track recorded on a magnetic tape, the correction circuit is favorably adapted to produce a continuous time code sequence despite dropout in the recorded time code. Also, if a jump occurs in the recorded time code sequence, the correction circuit causes the output time code to reflect such jump with a minimum of signal disturbance.

6 Claims, 4 Drawing Figures

FIG. 3

| | | | | | | | | | | |
|---|---|---|---|---|---|---|---|---|---|---|
| A | 1 | 2 | 3 | 3 | 3 | 3 | 4 | 5 | 5 | 5 | 5 |
| Ba | X | 2 | 3 | 4 | 4 | 4 | 4 | 5 | 6 | 6 | 6 |
| Bb | X | X | 3 | 4 | 5 | 6 | 7 | 5 | 6 | 7 | 8 |
| D | X | X | 3 | 4 | 5 | 6 | 7 | 5 | 6 | 7 | 8 |

FIG. 4

| | | | | | | | | | | |
|---|---|---|---|---|---|---|---|---|---|---|
| A | 1 | 2 | 3 | 4 | 5 | 10 | 11 | 12 | 13 | 14 | 15 |
| Ba | X | 2 | 3 | 4 | 5 | 6 | 11 | 12 | 13 | 14 | 15 |
| Bb | X | X | 3 | 4 | 5 | 6 | 7 | 12 | 13 | 14 | 15 |
| D | X | X | 3 | 4 | 5 | 6 | 7 | 12 | 13 | 14 | 15 |

DATA CORRECTION CIRCUIT

BACKGROUND OF THE INVENTION

1. Field of the Invention

The present invention relates to a correction circuit for correcting errors in input data, and particularly relates to a data correction circuit suitable for correcting errors in a sequence of generally regularly and progressively incremented input data, such as digital time code reproduced from the timing track of a magnetic tape.

2. Brief Description of the Prior Art

In the video arts, when a video signal is recorded on a magnetic tape, audio signals, control signals, and time code signals corresponding to the video signal are normally recorded concurrently with the video signal on the tape. The time code signals are normally reproduced from the tape during a playback of the recorded video signal, and are especially useful in the electronic editing of the video signals. More particularly, the time code signals can be used to quickly find the beginning and/or end of a desired video sequence to be edited.

The time code signal is an orderly, incremental digital data signal whose value represents a frame number of the video signal and also indicates the time (hour, minute, and second) of the respective video frame. The time code signal is normally recorded on the magnetic tape in a separate track at the edge of the tape, but can instead be recorded together with the video signal during the vertical blanking interval of each field. The value of the time code signal increases (or decreases) by a predetermined amount for each frame. The value normally increases when the tape is moving in the forward direction during playback, and decreases when the tape is moving in the reverse direction. However, because this time code signal is relied upon for electronic editing, if an error occurs in the played back time code signal, difficulties will arise in the accurate electronic editing of the recorded video program recorded on the tape.

In order to avoid such problems, there has been previously proposed a circuit utilizing the regularity and the incremental nature of the time code signal to detect errors occurring in the played back time code data, and to correct such errors. Such previously proposed error correction circuits, an example of which is illustrated in more detail below, utilize a memory for storing data representing the played back time code data signal, a digital comparator for comparing the stored data with played back time code data, a switch coupled to the comparator and outputting the played back time code data when the latter has the same value as the data stored in the memory, but outputting the stored data when the latter and the played back code signal are unequal. The switch output is incremented and then written into the memory. Such previously proposed circuit also includes a control circuit for causing the switch to select the played back time code data as an output after a small predetermined number of successive errors (typically six errors) have been detected.

While the foregoing type of correction circuit is adequate in most circumstances, it does have at least the following drawbacks.

If dropout occurs in the time code signal, the number of successive errors in the played back time code signal may exceed the predetermined number of errors for which the control circuit is set. This can result in the time code data being incompletely corrected.

Furthermore, if the time code signal has been recorded on the magnetic tape by electronic editing, it may contain a "jump", that is, a discontinuity in the sequence of the time code recorded on the tape. However, the previously proposed correction circuit will provide its output signal delayed by a time corresponding to the number of errors which must be counted by the control circuit. If this number is a typical value, such as six, the jump in the output signal will be delayed by an error of six frames, and will result in a noticeable error in the reproduced video signal. Moreover, if the predetermined number of errors to be counted in the control circuit is selected to be a higher number of errors to accommodate dropout, the resulting error in the reproduced video signal will be even more noticeable.

While it is possible to arrange the control circuit to be adjustable, it is particularly troublesome to adjust the number of errors to be counted in the control circuit. Thus, the predetermined number is normally fixed at a relatively small value. Accordingly, with the previously proposed correction circuit, the errors in the played back time code signal are not completely corrected, and electronic editing of the recorded video signal is rendered somewhat difficult to accomplish.

OBJECTS AND SUMMARY OF THE INVENTION

Accordingly, it is an object of this invention to provide a novel data correction circuit which is free from the drawbacks encountered in the prior art.

It is another object of this invention to provide an improved time code correction circuit which can respond rapidly to signal dropout or to discontinuities in a sequence of data that occurs in a generally regularly and progressively incremented form.

According to an aspect of this invention, a data correction circuit for correcting errors in a sequence of generally regularly and progressively incremented input data, such as a time code signal, comprises an input circuit for receiving the input data, a first memory, a second memory, an adder for selectively incrementing or decrementing data supplied thereto and supplying the incremented or decremented data therefrom to the first and second memories, a comparator for comparing the data stored in the first memory with the input data, a switch controlled by the comparator for selectively supplying the adder with the input data and the data stored in the second memory, and an output circuit coupled to at least the second memory for providing corrected output data.

The present invention is favorably adapted for correcting time code data reproduced by a reproducing transducer from a time code signal recorded on a record medium. Preferably, the comparator provides first and second memory control signals, at staggered times, to the first and second memories, and the comparator and the switch are arranged such that when the comparator determines that the input data and the data stored in the first memory are equal, the input data is supplied to the adder so that the incremented input data is stored in both the first and the second memories, but when the comparator determines that the input data and the data stored in the first memory are unequal, the data stored in the second memory is supplied to the adder at least during the occurrence of the second memory control signal, so that the data in the second memory is incremented and again stored therein.

The above and other objects, features, and advantages of this invention will be apparent from the ensuing description, when read in conjunction with the accompanying drawings.

BRIEF DESCRIPTION OF THE DRAWINGS

FIGS. 3 and 4 are data charts useful in explaining the operation of the data correction circuit of FIG. 2.

DETAILED DESCRIPTION OF A PREFERRED EMBODIMENT

By way of background for the present invention, and to help in understanding the advantages that this invention affords, a previously-proposed data correction circuit will first be described with reference to FIG. 1.

Figure 1:
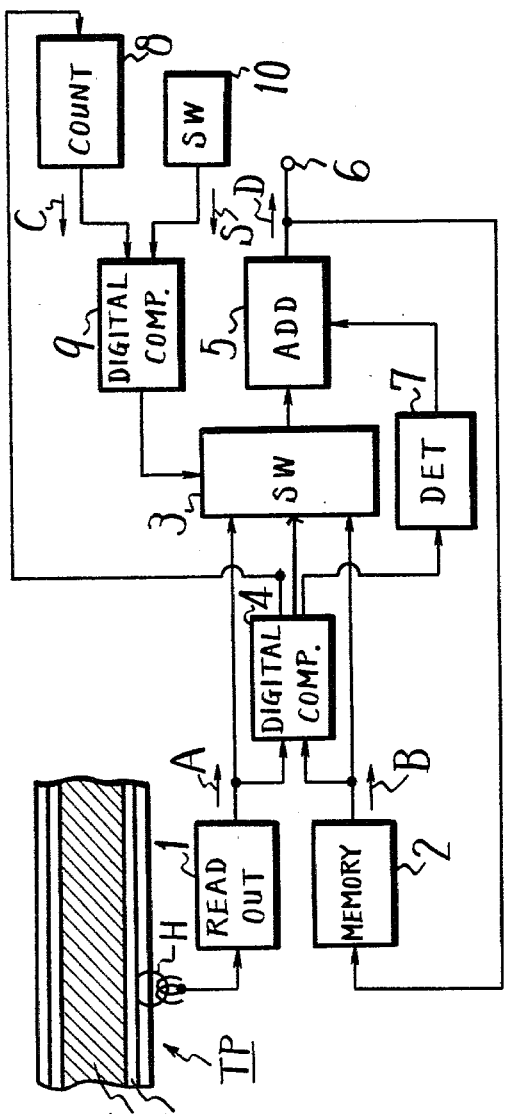
FIG. 1 is a block diagram of a previously-proposed data correction circuit.

As shown in FIG. 1, a video signal is recorded on a magnetic tape TP with the video signal recorded in slant video tracks VT thereon. A time code signal to indicate the frame number and the time (hour, minute, and second) of the video signal is recorded in a timing track TT at one edge of the magnetic tape TP. A magnetic head H picks up the time code signals recorded in track TT when the magnetic tape TP is moved past it. The picked-up time code signals are then provided to a read-out circuit 1 which decodes the signals and provides reproduced time code data A.

A memory 2 stores time code data B corresponding to the reproduced time code data A. The reproduced time code data A and the stored time code data B are applied to respective inputs of a switching circuit 3 and are also applied to inputs of a digital comparator 4 to be compared with one another. Digital comparator 4 has an error output applied to switching circuit 3 to control the same so that when the reproduced time code data A and the stored time code data B are equal to one another (A=B), the switching circuit 3 provides the reproduced time code data A from its output, but when the stored time code data B and the reproduced time code data A are different (A≠B), the switching circuit 3 provides the stored time code data B at its output. The output of the switching circuit 3 is provided to an adder 5 which adds or subtracts a unit increment d. A sum output from the adder 5 is provided at an output terminal 6, as an output data D, i.e., an error-corrected time code data. The output data from the adder 5 is also applied to an input of the memory 2 and is written therein. An output of the comparator 4 is also applied to a detecting circuit 7 which determines whether the reproduced time code data A is sequentially increasing (corresponding to the forward-running of the magnetic tape TP) or decreasing (corresponding to reverse-running of the tape TP), and in response provides a detected output to the adder 5 to control the same. Thus, the adder 5 increments the output of the switching circuit 3 by d when the reproduced time control data A is increasing, and decrements the output of the switching circuit 3 by d when the reproduced time control data A is decreasing. Consequently, under normal circumstances, the reproduced time code data A is applied through the switching circuit 3 as the basis for the output data D. However, if errors occur in the reproduced data A, for instance, because of data dropout, the stored time control data B is applied through the switching circuit 3, and is properly incremented in adder 5 to provide the output data D substantially free of errors.

A control circuit formed of a counter 8, a digital comparator 9, and an external switch 10 is provided to automatically reset the switching circuit 3. This arrangement permits the data correction circuit to accommodate so-called "jumps" in the time code signal.

An output of the digital comparator 4 is supplied to an input of the counter 8 to control the same so that counter 8 increments by one each time the reproduced time code data A and the stored time code data B are determined to be unequal (A≠B) and is reset to zero whenever these data are determined to be equal (A=B). Counter 8 provides an output count C to the digital comparator 9. The external switch 10 is preset at a predetermined number, and a data signal S representing such number is also applied to the comparator 9 to be compared with the output count C from the counter 8. The output of the comparator 9 is then applied to a control terminal of the switching circuit 3. Thus, when the output count C of the counter 8 equals or exceeds the value of the data signal S from switch 10, the switching circuit 3 is reset to select the reproduced time code data A. The time code data A is then incremented or decremented by d, and is written into the memory 2.

In the above data correction circuit, the corrected data are obtained sequentially at the output terminal 6 until the output count C (corresponding to the number of consecutive errors in the reproduced time code data A) reaches the predetermined number of the data signal S as set by the external switch 10. However, when the detected number of errors C exceeds the preset value of the data signal S, the reproduced time code data A is regarded as being correct even though it may contain errors, and the reproduced data A will be provided, without correction, at the output terminal 6.

If a considerable amount of data dropout is expected to occur and a large number of errors in the reproduced time code data A are expected, the value of data signal S can be set to a large value so that the reproduced data A is rather thoroughly corrected.

However, if the time code signal recorded in the track TT by electronic editing contains jumps, the occurrence of the jumps in the output D will be delayed, by an amount corresponding to the set or programmed number of errors corresponding to the data signal S, from the point at which the jump occurs. Thus, if jumps are expected in the played back time code signal, the switch 10 should be set so that the number of errors (i.e. the value of the signal S) is small.

However, it is impractical and quite troublesome to adjust the switch 10 each time the condition of the time code signal changes, and, hence, the data signal S is normally fixed at a relatively small value. Accordingly, as indicated above, there is a high likelihood that the reproduced time control data will be provided without proper error correction.

An embodiment of the data correction circuit according to the present invention will now be described with reference to FIG. 2. The circuit according to this invention will provide reliable correction of errors occurring in reproduced time code data but will readily accommodate jumps or other discontinuities in the time code data.

Figure 2:
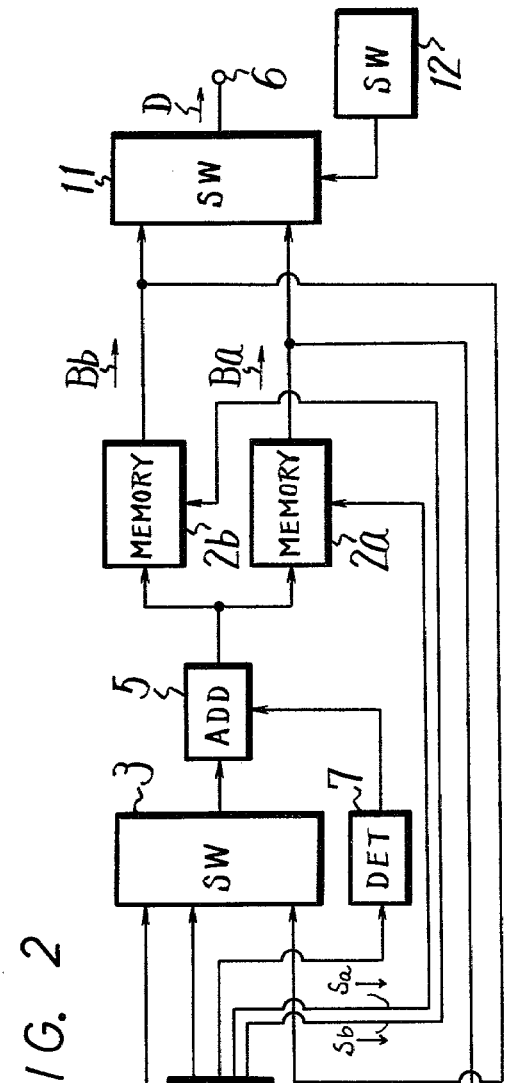
FIG. 2 is a block diagram of one embodiment of a data correction circuit according to this invention.

In the embodiment shown in FIG. 2, elements corresponding to those illustrated in FIG. 1 are identified by like reference numerals, and a detailed description thereof is omitted.

In this embodiment, first and second digital memories 2a and 2b are provided with inputs to receive the incremented signal provided from the adder 5. These memories 2a and 2b contain respective stored time code data Ba and Bb. The reproduced time code data A is applied to an input of the switching circuit 3, and the stored time code data Bb is provided from the second memory 2b to another input of the switching circuit 3. The stored time code data Ba is supplied from the first memory 2a to an input of the digital comparator 4 to be compared with the reproduced time code data A. Also, the digital comparator 4 provides first and second memory control signals Sa and Sb, at staggered times, to the first and second memories 2a and 2b, respectively. The compared output of the digital comparator 4 is applied to the switching circuit 3 to select which of the reproduced time code data A and the stored time code data Ba is to be applied to adder 5.

An output circuit is formed of an output switch 11 and an error switch 12 coupled thereto. The output switch 11 has intput terminals effectively coupled to the memories 2a and 2b and an output coupled to the output terminal 6. Selector switch 12 operates to cause output switch 11 to select the first stored data Ba and to select the second stored data Bb when the error switch 12 is OFF and ON, respectively.

Whenever the error switch 12 is turned ON, the output data D provided through output switch 11 corresponds to the second stored data Bb, and represents a properly corrected version of the reproduced data A.

The operation of the foregoing embodiment of this invention can be understood from the following discussion, wherein the subscript i indicates the ith data in sequence, while the subscript (i+1) indicated the next successive data.

According to the data correction circuit of this embodiment, when the reproduced time code data $A_i$ and the stored time code data $Ba_i$ are equal, the switching circuit 3 selects the reproduced data $A_i$. This data $A_i$ is supplied to the adder 5 where it is properly incremented or decremented by d, and the resulting added output from the adder 5 is applied to the memories 2a and 2b to be written therein simultaneously.

If, however, the reproduced data $A_i$ and the stored data $Ba_i$ are unequal, the switching circuit 3 first provides the reproduced data $A_i$ to the adder 5 to be incremented or decremented by d, and the thus-added output $A_i \pm d$ therefrom is written only into the memory 2a. Next, the switching circuit 3 applies the stored data $Bb_i$ to the adder 5 to be incremented or decremented by d, and the thus-added output $Bb_i \pm d$ from the adder 5 is written only into the second memory 2b.

In summary, the stored data Ba and Bb observe the following relationships:

(1) When $A_i = Ba_i$, $Ba_{i+1} = Bb_{i+1} = A_i \pm d$; but (2) When $A_i \neq Ba_i$, $Ba_{i+1} = A_i \pm d$ and $Bb_{i+1} = Bb_i \pm d$.

In the examples of FIGS. 3 and 4, for the sake of simplicity, the time code data is expressed as a single digit (1, 2, 3, ...) representing the frame number. Also, in the examples of FIGS. 3 and 4, the unit increment d is unity (i.e., d=1).

FIG. 3 illustrates an example wherein the reproduced time code data A is repeated (e.g., indicating a slow-motion video sequence). In this case, the reproduced data A remains at "3" for four frames. At this time, the first stored data Ba remains at "4" until the reproduced data A also become equal to "4". During this time, the second stored data Bb changes progressively from "4" through "7". Then, when the reproduced data A becomes "5" the second stored data Bb is set to "5" and then progresses to "6", "7", "8", etc.

In the example of FIG. 4, the reproduced data A has a so-called jump from "5" to "10". Here, the second stored data Bb progresses to "7" and then jumps to "12", as does the output data D.

According to the present invention as described above, a correction circuit for correcting a sequence of data that increments in a regular fashion will reliably correct errors occurring in the data and will also respond rapidly to jumps in the data.

While an embodiment of this invention has been illustrated in the context of video signals recorded on magnetic tape, it will be appreciated that the circuit of this invention can enjoy a wide range of applications.

Furthermore, while the principles of this invention have been described above in connection with a single specific embodiment, it will be apparent to those of skill in the art that many modifications and variations thereof are possible without departure from the spirit or scope of this invention, which is to be ascertained from the appended claims.

What is claimed is:

1. A data correction circuit for correcting errors in a sequence of generally regularly and progressively incremented input data comprising input circuit means for receiving the input data; first memory means for storing data; second memory means for storing data; incrementing means for incrementing data supplied thereto in a selected one of positive and negative senses and supplying the incremented data therefrom to said first and said second memory means; comparing means for comparing the data stored in said first memory means with said input data; switch means controlled by said comparing means for selectively supplying said incrementing means with one of said input data and the data stored in said second memory means; and output means coupled to at least said second memory means for providing corrected output data.

2. A data correction circuit according to claim 1, wherein said input circuit means includes a reading transducer for reproducing time code data recorded on a record medium.

3. A data correction circuit according to claim 1, wherein said comparing means includes means to detect whether the sequence of input data is being progressively incremented in the positive sense or is being progressively incremented in the negative sense, and to control said incrementing means to increment the data supplied thereto in the respective one of the positive and negative senses.

4. A data correction circuit according to claim 1, wherein said comparing means provides first and second memory control signals, at staggered times, to said first and second memory means.

5. A data correction circuit according to claim 4, wherein when said comparing means determines that said input data and the data stored in said first memory means are equal, the input data is supplied to said incrementing means so that the incremented input data is stored in both said first and said second memory means, but when said comparing means determines that said input data and the data stored in said first memory means are unequal, the data stored in said second memory means is supplied to said incrementing means at least during the occurrence of the second memory control signal, so that the data in said second memory means is incremented and again stored therein.

6. A data correction circuit according to claim 1, wherein said output means includes a switch having an output to provide the output data, inputs respectively coupled to receive the contents of said first and said second memory means, and a control terminal; and an error switch providing a control signal to said control terminal.

* * * * *